United States Patent
Allum et al.

[15] 3,674,768

[45] July 4, 1972

[54] MODIFIED POLYALCOHOL

[72] Inventors: Keith George Allum, 28 Coppice Green, Bracknell; Ronald David Hancock, 19 Netherby Park, Weybridge, both of England

[22] Filed: Jan. 12, 1970

[21] Appl. No.: 2,398

[30] Foreign Application Priority Data

Dec. 30, 1969 Great Britain..........................5,193/69

[52] U.S. Cl. ..................260/91.3 VA, 260/85.3 R, 260/93.7, 260/94.3, 260/94.9 B, 252/431 P
[51] Int. Cl. .........................................................C08f 27/04
[58] Field of Search ..........................................260/91.3 VA

[56] References Cited

UNITED STATES PATENTS

| | | | |
|---|---|---|---|
| 2,489,225 | 11/1949 | Morris | 260/230 |
| 2,941,973 | 6/1960 | Kumnick et al | 260/30.6 |

*Primary Examiner*—Joseph L. Schofer
*Assistant Examiner*—Stanford M. Levin
*Attorney*—Morgan, Finnegan, Durham & Pine

[57] ABSTRACT

Transition metal-containing catalysts are prepared by reacting a transition metal compound with a polymer containing trivalent phosphorus and hydroxyl groups. The phosphorus-containing polymer is prepared by reacting a polymer containing hydroxyl groups such as polyvinyl alcohol with a trivalent phosphorus compound such as phenyl dichlorophosphine. Preferred transition metals are the Group VIII metals. The catalysts are useful for hydroformylation, hydrogenation, oligomerization and carboxylation.

10 Claims, No Drawings

MODIFIED POLYALCOHOL

This invention relates to novel metal-containing polymers. The use of phosphine complexes of transition metals as homogeneous catalysts for a variety of reactions such as carboxylation, hydrogenation and oligomerization of olefins is known. These catalysts often contain valuable metals, for example, palladium and iridium and catalyst recovery and recycle is therefore of great importance. However, it is often a problem to achieve a high degree of catalyst recovery.

We have now discovered that phosphine-containing polymers containing transition metals bonded to the phosphorus atoms can be prepared, many of which have similar catalytic properties to the catalysts mentioned above but which are generally easier to recover. These compositions may also be useful as heat and flame retardant materials and pigmented materials.

Thus according to the present invention there is provided a polymeric material containing phosphorus atoms and transition metal atoms, the polymer containing groups of the formula:

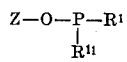

where Z is a radical obtained by removing an —OH group from an hydroxyl group-containing polymer, $R^1$ and $R^{11}$ which may be the same or different are halogen atoms or monovalent hydrocarbon groups containing up to 20 carbon atoms or aryloxy or alkoxy groups containing up to 20 carbon atoms or of formula $R_2^{111} N$— where $R^{111}$ is a group containing up to 10 carbon atoms or —OZ where Z is as defined above, the phosphorus atoms of which groups are bonded to transition metal atoms.

Preferred transition metals are Group VIII metals although Cr, Mo, Mn, W, Re, Ti, V, Cu, and Au may also be used. Suitable Group VIII metal compounds are those capable of reacting with phosphines or substituted phosphines phosphites, substituted phosphites and other trivalent phosphorus compounds. Examples are halides such as the chlorides of formula $Rh Cl_3$, $M Cl_2$ (where M is a divalent Ni, Pd, Pt, or Co), $Na_2Pd Cl_4$, $Ir Cl_3$, $Ti Cl_4$, $Cr Cl_3$, ethylene complexes of iridium, palladium or platinum halides or carboxylates, II allyl compounds such as II allyl nickel chloride or ts complexes with aluminum, alkyl, olefin cyclopentadienyl or II aromatic complexes.

Also suitable are metal carbonyls and carbonyl-containing metal complexes e.g. $Ni(CO)_4$, $Co_2(CO)_8$, $Rh(CO)_2$ acac, $Fe(CO)_5$, $Mn_2(CO)_{10}$, $M(CO)_6$ where M is Cr, Mo, or W, $V(CO)_6$, $Rh_2(CO)_4Cl_2$ and $RCO Co(CO)_4$ where R is an alkyl or aryl group.

According to another aspect of the present invention there is provided a process for the preparation of a polymeric material containing phosphorus atoms and having transition metal atoms bonded to the phosphorus atoms which process comprises reacting (a) a polymeric material containing groups of the formula

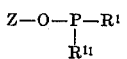

as hereinbefore defined with (b) a transition metal compound at a temperature in the range —40° to 250° C under conditions such that the transition metal atoms become bonded to the trivalent phosphorus group.

Preferably the reaction is carried out at —20° to 180° C.

The polymeric material may contain from 0.01 to 30 percent by wt of phosphorus and from 0.01 to 20 percent by wt of transition metal, preferably 0.01–15 percent wt. The polymeric material for the reaction may have a molecular weight of from 500 to $10^7$ and since the reaction does not greatly increase the molecular wt the product polymeric material aLso may have a molecular weight approximately from 500 to $10^7$, preferably from $10^3$ to $10^6$. The polymeric material of formula

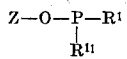

for the reaction may be prepared as described in U.S. Ser. No. 1,888, filed Jan. 9, 1970 and having a common assignee.

The compositions of the present invention are prepared at temperatures in the range —40° to 250° C. The reaction is often effected by warming the transition metal compound and the phosphorus-containing support in a suitable inert solvent for one or both of the reactants. In some cases it will be desirable to perform the reaction at room temperature or below. Saturated or aromatic hydrocarbons, alcohols, ethers, or mixtures of these may be used as solvents.

Heating will usually be carried on for one-half to 24 hours but the reaction time may be longer or shorter in specific instances. Sometimes the reaction is indicated by a color change or by evolution of gas, e.g., carbon monoxide.

In the formation of the metal-containing polymer it often occurs that one of the following reactions takes place:

a. the transition metal compound contains a displaceable ligand such as carbonyl, olefin, diolefin, phosphine or a solvent molecule, e.g., tetrahydrofuran, and the ligand is displaced under the reaction conditions while the transition metal atom becomes bonded to the phosphorus, e.g.,

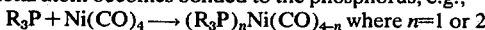
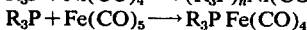
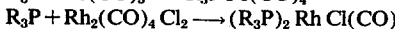
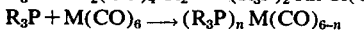

where M = Cr, Mo or W, $n = 1$ or 2 and $R_3P + Rh(CO)_2$ acac $R_3P Rh(CO)$ acac where acac is acetylacetonate. also

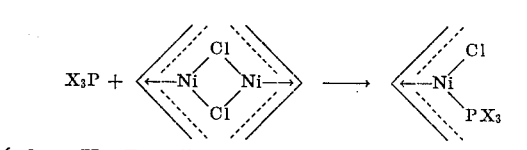

(where X = R or RO)

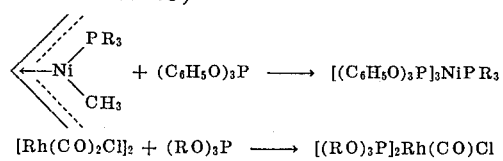

b. the transition metal is capable of increasing its coordination number under the reaction conditions and thereby permits the metal to phosphorus bond to be formed, e.g.,

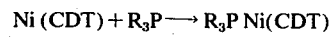

where CDT is 1,5,9 cyclododecatriene

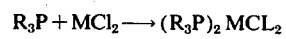

where M is divalent nickel, palladium, platinum, or cobalt

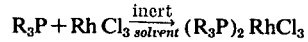

c. The reaction takes place in the presence of a solvent which enters into the reaction, e.g., $C_2H_5OH$ admixed with KOH which introduces a CO group as in

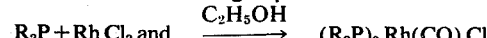

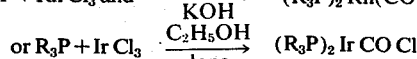

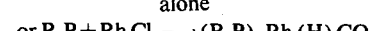

effected in HC HO in ethanol or $NaBH_4$ in ethanol

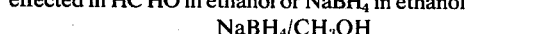

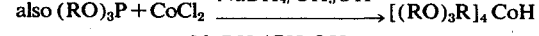

In the above formula at least one of the R groups will be either Z or OZ.

Many of the compositions of this invention are active as catalysts and are similar to such homogeneous phosphine containing complexes as $IrH_3 (PH_3P)_3$ or $IrH_2 (OOCCH_3) (Ph_3P)_3$ for the hydrogenation of aldehydes or $PdCl_2$ $(Bu_3P)_2$ for the carboxylation of olefins.

A co-catalyst such as an aluminum alkyl, aluminum alkyl halide or aluminum trihalide or sodium borohydride may be necessary to render the phosphine containing complex active.

A number of catalysts systems consist of a mixture of transition metal compound, a phosphine and a reducing agent, such as an aluminum alkyl. Examples are:

$M(acac)n + Ph_3P + Et_2Al(OEt)$ for the cyclodimerization of butadiene where M is Fe (III), Co(III) or Ni (II), $n$ is 2 or 3 and acac is acetylacetonate.

$Ni(acac)_2 + R_3P + Et_3Al_2Cl_3$ for propylene oligomerization and $(RCOO)_2Ni + Ph_3P + R_2AlCl$ for propylene dimerization. The active species in these cases is formed in situ.

Phosphite species are also active. Examples of these are: $(C_6H_5O)_3P/(1,5$ cyclo-octadiene$)_2Ni$, $[(C_6H_5O)_3P]_4Ni$, and $[(RO)_3P]_2Ni(CO)_2$ for the cyclo-oligomerization of butadiene, $(RO)_3P/(II\ CH_2=CHCN)_2Ni$ (where R is an alkyl or aryl group) for the oligomerization of olefins, $(II\ C_3H_5)NiBr/[P(OR)_3b-$ for the dimerization of propylene and $Ni(acac)_2/(Et_3Al)/(RO)_3P$ for the codimerization of butadiene and ethylene.

The trivalent phosphorus compounds in this case may be replaced by the polymer containing trivalent phosphorus groups, forming the active species on the polymer surface and providing a catalyst which utilizes a composition according to the present invention.

The polymers of the present invention can, in some cases, be used as heterogeneous catalysts which can either be separated from the reaction products in the case of a slurry process or used in a fixed bed process.

In some cases the catalysts compositions of this invention may be liquid or may dissolve in the reaction medium in which case they can be used homogeneously. However as they are macromolecular they can be precipitated out, e.g., by the addition of another solvent or otherwise recovered quite simply from the reaction products.

The invention is illustrated by the following examples.

EXAMPLE 1

17.9 g of $(C_6H_5)PCl_2$ dissolved in 25 ml toluene was added to 4.4 g polyvinyl alcohol suspended in 25 ml toluene under nitrogen. The reaction mixture was refluxed for 4 hours and the polymer was isolated.

The polymer obtained was added to a solution containing 2 g anhydrous $CoCl_2$ in 50 ml n-butanol. The reaction mixture was refluxed for 2 hours under $N_2$. The polymer was isolated, washed several times with hot butanol, washed with pentane and evacuated. A green polymer results (anhydrous $CoCl_2$ is blue and hydrated $CoCl_2$ is pink).

Cobalt content = 1.2 percent weight

EXAMPLE 2

A phosphorus-containing polymer (prepared from polyvinyl alcohol and $C_6H_5PCl_2$ as described in UK Application No. 5194/69 was used in the following experiments.

Phosphorus content = 10.2 percent wt a. 0.65 g of anhydrous $CoCl_2$ were dissolved in 75 ml of dry n-butanol under nitrogen. 3.1 g of phosphorus-containing polymer were added and the reaction mixture stirred under reflux for 1 hour. A green polymer resulted. The product was washed with n-butanol until the washings were colorless then washed with ethanol and dried under vacuum.

Cobalt content of product = 2.5 percent wt b. 0.93 g of $RhCl$ $(P(C_6H_5)_3)_3$ were dissolved under nitrogen in degassed benzene. 0.62 g of phosphorus-containing polymer were added and the reaction mixture stirred at room temperature for 24 hours. The resulting pink polymer was washed with benzene until the washings were free from color and then dried under vacuum.

Rhodium content of product = 0.8 percent wt c. 1.3 g of $Re_2(CO)_{10}$ were dissolved in 75 ml of dry xylene under nitrogen. 1.24 g of phosphorus-containing polymer were added and the reaction mixture refluxed for 1 hour. The resulting red polymer was extracted with xylene and pentane and dried under vacuum.

Rhenium content of product = 3.4 percent wt 0.49 g of cyclo-octadiene rhodium chloride ($[Rh Cl(COD)]_2$) were dissolved in 50 ml of degassed benzene under nitrogen. 0.62 g of phosphorus-containing polymer were added and the reaction mixture refluxed for 2 hours. The resulting orange/yellow polymer was washed with benzene and dried under vacuum.

Rhodium content of product = 1.8 percent wt e. 7.6 ml of a 10 percent wt aqueous solution of $Na_2Pt\ Cl_4$ were dissolved in 50 ml of ethanol. 0.76 g of phosphorus-containing polymer were added to the reaction mixture under nitrogen and heated, with stirring at 50° C for 2 hours. The resulting brown/yellow polymer washed with ethanol until the washings were colorless and then dried under vacuum.

Platinum content of product = 7.1 percent wt f. 0.52 g of $Mo(CO)_6$ were dissolved in 50 ml of diglyme under nitrogen. 1.2 g of phosphorus-containing polymer were added and the reaction mixture refluxed at 100° C for 1 hour. The resulting polymer was extracted several times with benzene and dried under vacuum.

Molybdenum content of product = 3.8 percent wt

What we claim is:

1. A polymeric material containing phosphorus atoms and atoms of a Group VIII metal, rhenium or molybdenum, the polymer containing groups of the formula:

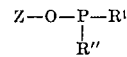

where Z is a radical obtained by removing an —OH group from polyvinyl alcohol, $R^1$ and $R''$ which may be the same or different are halogen atoms or monovalent hydrocarbon groups containing up to 20 carbon atoms or aryloxy or alkoxy groups containing up to 20 carbon atoms or of formula $R_2^{111}N-$ where $R^{111}$ is a group containing up to 10 carbon atoms or —OZ where Z is as defined above, the phosphorus atoms of which groups are bonded to a Group VIII metal atom, rhenium or molybdenum metal atom, the resulting polymeric material containing from 0.01 to 30 percent by wt of phosphorus and from 0.01 to 20 percent by weight of metal.

2. A polymeric material as claimed in claim 1 having a molecular weight of from $10^3$ to $10^6$.

3. A polymeric material as claimed in claim 1 wherein the metal is a Group VIII metal.

4. A process for the preparation of a polymeric material containing phosphorus atoms and atoms selected from a Group VIII metal atom, rhenium or molybdenum bonded to the phosphorus atoms which process comprises reacting (a) a polymeric material containing groups of the formula:

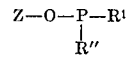

where Z is a radical obtained by removing an —OH group from polyvinyl alcohol, $R^1$ and $R''$ which may be the same or different are halogen atoms or monovalent hydrocarbon groups containing up to 20 carbon atoms or aryloxy or alkoxy groups containing up to 20 carbon atoms or of formula $R_2^{111}N-$ where $R^{111}$ is a group containing up to 10 carbon atoms or $-OZ$ where Z is as defined above with (b) a Group VIII metal, rhenium or molybdenum metal compound at a temperature in the range $-40°$ to $250°$ C.

5. A process as claimed in claim 4 wherein the reaction is effected in the presence of a solvent.

6. A process as claimed in claim 5 wherein the metal compound is a Group VIII metal compound.

7. A process as claimed in claim 4 wherein the metal compound contains a ligand which is displaced under the conditions of the reaction.

8. A process as claimed in claim 4 wherein the metal of the metal compound increases its coordination number under the conditions of the reaction.

9. A process as claimed in claim 4 wherein the reaction is effected in the presence of a solvent which takes part in the reaction.

10. A process as claimed in claim 6 wherein the Group VIII metal compound is a compound of nickel, rhodium, cobalt, ruthenium, iron, iridium, palladium, or platinum.

* * * * *

PO-1050
(5/69)

UNITED STATES PATENT OFFICE
CERTIFICATE OF CORRECTION

Patent No. 3,674,768                Dated    July 4, 1972

Inventor(s) Keith George Allum et al

It is certified that error appears in the above-identified patent and that said Letters Patent are hereby corrected as shown below:

Column 1, line 43, change "ts" to -- its --.

Column 2, line 55, change "$(R_3P)_2RhCl_3$" to -- $(R_3P)_3RhCl_3$ --.

Column 3, line 9, change "M(acac)n" to -- $M(acac)_n$ --.

Signed and sealed this 19th day of February 1974.

(SEAL)
Attest:

EDWARD M. FLETCHER, JR.
Attesting Officer

C. MARSHALL DANN
Commissioner of Patents